(12) United States Patent
Ding et al.

(10) Patent No.: US 12,556,083 B2
(45) Date of Patent: Feb. 17, 2026

(54) POWER FACTOR CORRECTION AND DIRECT CURRENT (DC)-DC MULTIPLEXING CONVERTERS

(71) Applicant: Lian Zheng Electronics (Shenzhen) Co., Ltd., Shenzhen (CN)

(72) Inventors: Yusong Ding, Shenzhen (CN); Kai Liu, Shenzhen (CN); Zhongyong Xu, Shenzhen (CN)

(73) Assignee: Lian Zheng Electronics (Shenzhen) Co., Ltd., Shenzhen (CN)

( * ) Notice: Subject to any disclaimer, the term of this patent is extended or adjusted under 35 U.S.C. 154(b) by 0 days.

(21) Appl. No.: 18/903,128

(22) Filed: Oct. 1, 2024

(65) Prior Publication Data

US 2025/0119055 A1 Apr. 10, 2025

(30) Foreign Application Priority Data

Oct. 10, 2023 (CN) .......................... 202311310169.2

(51) Int. Cl.
*H02J 9/06* (2006.01)
*H02M 1/42* (2007.01)
*H02M 3/158* (2006.01)

(52) U.S. Cl.
CPC ............. *H02M 1/4208* (2013.01); *H02J 9/06* (2013.01); *H02M 3/158* (2013.01)

(58) Field of Classification Search
CPC .... H02M 1/4208; H02M 3/158; H02M 1/007; H02M 1/4225; H02M 1/44; H02M 3/156; H02M 7/06; H02M 1/10; H02J 9/06; H02J 9/061; Y02B 70/10

USPC .......................................................... 307/66
See application file for complete search history.

(56) References Cited

FOREIGN PATENT DOCUMENTS

| EP | 2548286 B1 | 1/2013 |
|----|------------|--------|
| EP | 2737603 B1 | 6/2014 |
| EP | 4239837 A1 | 9/2023 |

OTHER PUBLICATIONS

Fernandes et al. "A Half-Bridge Doubler Boost Operating as AC-DC and DC-DC Converter," Nov. 20, 2016, pp. 1-8 (Year: 2016).*

(Continued)

*Primary Examiner* — Rexford N Barnie
*Assistant Examiner* — Xuan Ly
(74) *Attorney, Agent, or Firm* — Stanek Lemon Crouse & Meeks, PA

(57) ABSTRACT

A power factor correction and direct current (DC)-DC multiplexing converter is provided. One end of an inductor is selectively connected to a mains supply or a positive electrode of a battery. A first rectifier bridge arm with a first intermediate node and a second rectifier bridge arm with a second intermediate node are separately connected between a first node and a second node, the first intermediate node is connected to the other end of the inductor, and the second intermediate node is connected to a neutral point. A first semiconductor switch controls conduction between the first node and the second node. A second semiconductor switch controls conduction between the second node and a negative direct current bus. A third semiconductor switch controls conduction between the neutral point and a negative electrode of the battery. The positive and negative direct current buses are configured to provide a direct current output.

10 Claims, 8 Drawing Sheets

(56) References Cited

OTHER PUBLICATIONS

Fernandes, et al., "A Half-Bridge Doubler Boost Operating as AC-DC and DC-DC Converter," 2016 12th IEEE International Conference on Industry Applications (INDUSCON), Nov. 20, 2016, pp. 1-8.
Extended European Search Report, EP24204940.1, Feb. 20, 2025, 6 pages.

* cited by examiner

POWER FACTOR CORRECTION AND DIRECT CURRENT (DC)-DC MULTIPLEXING CONVERTERS

CROSS-REFERENCE TO RELATED APPLICATION

This application claims priority to Chinese Application No. 202311310169.2, filed Oct. 10, 2023, the content of which is hereby incorporated herein as if set forth in its entirety.

FIELD

The present inventive concept relates generally to the field of power electronics, and in particular, to a power factor correction and direct current (DC)-DC multiplexing converter.

BACKGROUND

An uninterruptible power supply (UPS) is an uninterruptible power supply including an energy storage device, and is configured to instantaneously switch from a mains supply to a battery to provide continuous power to a load when the mains supply is abnormal, so as to protect the load from damage due to interruption in the mains supply. Therefore, the UPS is widely used in industrial, commercial, and consumer fields. A current development focus of the uninterruptible power supply is to reduce a quantity of batteries (for example, designed as a single battery), reduce a battery voltage, and avoid introducing a neutral line in a battery circuit. This type of uninterruptible power supply generally includes an AC-DC power factor control (PFC) circuit that converts an alternating current input from an alternating current input terminal into a direct current, and a DC-DC circuit that discharges from a battery. For a single-battery uninterruptible power supply, there are currently two design directions in the industry. The first is to separately design the foregoing AC-DC power factor control circuit and the DC-DC circuit used for battery discharge. Apparently, the uninterruptible power supply designed in this way has a large size and increased costs. In a second design solution, the AC-DC power factor control (PFC) circuit is multiplexed with the DC-DC circuit used for battery discharge, thereby reducing a quantity of power components and reducing the size. However, some existing multiplexing designs have the following defects: When in a battery mode, lines connected to positive and negative electrodes of the battery have high-frequency jumping in electrical potential and poor electromagnetic compatibility (EMC), and therefore, two clamping diodes need to be used. However, after the diodes are added, one inductor in the battery mode is shorted, causing inductor overheating.

SUMMARY

To address some of the problems, the present inventive concept provides a power factor correction and DC-DC multiplexing converter. In a battery discharge mode, the power factor correction and the DC-DC multiplexing converter does not cause an EMC problem and problems of inductor overheating and low inductor utilization that exist after clamping diodes are added.

The present inventive concept provides a power factor correction and DC-DC multiplexing converter, including: a first mechanical switch RY1, configured to connect the converter to a mains supply; a second mechanical switch RY2, configured to connect the converter to a battery; an inductor L1, one end of which is connected to the mains supply through the first mechanical switch RY1, and connected to a positive electrode of the battery B21 through the second mechanical switch RY2; a first node N1 and a second node N2; a first rectifier bridge arm 213, connected between the first node N1 and the second node N2, where the first rectifier bridge arm 213 has a first intermediate node N3, and the first intermediate node N3 is connected to the other end of the inductor L1; a second rectifier bridge arm 214, connected between the first node N1 and the second node N2, where the second rectifier bridge arm 214 has a second intermediate node N4, and the second intermediate node N4 is connected to a neutral point N5; a first semiconductor switch Q1, connected between the first node N1 and the second node N2 to control conduction between the first node N1 and the second node N2; a positive direct current bus 211 and a negative direct current bus 212, configured to provide a direct current output; a first diode D6, connected between the first node N1 and the positive direct current bus 211; a second semiconductor switch Q2, connected between the second node N2 and the negative direct current bus 212, and configured to control conduction between the second node N2 and the negative direct current bus 212; a first capacitor C211, connected between the positive direct current bus 211 and the neutral point N5; a second capacitor C212, connected between the neutral point N5 and the negative direct current bus 212; a third semiconductor switch Q3, connected between the neutral point N5 and the negative electrode of the battery B21, and configured to control conduction between the neutral point N5 and the negative electrode of the battery B21; and a second diode D5, connected between the negative direct current bus 212 and the negative electrode of the battery B21.

In some embodiments, the conduction from the second node N2 to the negative direct current bus 212 is controlled, and the conduction from the negative direct current bus 212 to the second node N2 is uncontrolled.

In some embodiments, the second semiconductor switch Q2 is a transistor connected in antiparallel with a diode.

In some embodiments, the second semiconductor switch Q2, connected between the second node N2 and the negative direct current bus 212, includes that: A first electrode of the second semiconductor switch Q2 is connected to the negative direct current bus 212, and a second electrode of the second semiconductor switch Q2 is connected to the second node N2.

In some embodiments, the first semiconductor switch Q1 and the third semiconductor switch Q3 are transistors.

In some embodiments, the first semiconductor switch Q1, connected between the first node N1 and the second node N2, includes that: A first electrode of the first semiconductor switch Q1 is connected to the second node N2, and a second electrode of the first semiconductor switch Q1 is connected to the first node N1.

In some embodiments, the third semiconductor switch Q3, connected between the neutral point N5 and the negative electrode of the battery B21 includes that: A first electrode of the third semiconductor switch Q3 is connected to the negative electrode of the battery B21, and a second electrode of the third semiconductor switch Q3 is connected to the neutral point N5.

In some embodiments, the transistor is a MOSFET or an IGBT.

In some embodiments, the first rectifier bridge arm 213, connected between the first node N1 and the second node N2, includes that: The first rectifier bridge arm 213 includes a third diode D1 and a fourth diode D3, where a cathode of the third diode D1 is connected to the first node N1, an anode of the third diode D1 is connected to a cathode of the fourth diode D3, and an anode of the fourth diode D3 is connected to the second node N2.

In some embodiments, the second rectifier bridge arm 214, connected between the first node N1 and the second node N2, includes that: The second rectifier bridge arm 214 includes a fifth diode D2 and a sixth diode D4, where a cathode of the fifth diode D2 is connected to the first node N1, an anode of the fifth diode D2 is connected to a cathode of the sixth diode D4, and an anode of the sixth diode D4 is connected to the second node N2.

In some embodiments of the present inventive concept, the converter may only have one inductor, and inductor utilization is relatively high, thereby saving inductor costs and space. Multiplexing of a battery discharge DC-DC circuit and a mains supply PFC circuit is effectively implemented, and the size and costs of the entire system are saved. In the battery discharge mode, there will be no high-frequency jumping of a potential of a battery wire, improving EMC performance and resolving the problems of inductor overheating and low inductor utilization that exist after clamping diodes are added.

DETAILED DESCRIPTION

The following describes in detail specific embodiments of the present inventive concept. It should be noted that the embodiments herein are merely used as examples for description, and are not intended to limit the present inventive concept. In the following description, a large number of specific details are described to provide a thorough understanding of the present inventive concept. However, it is apparent to those of ordinary skill in the art that these specific details are not necessary to implement the present inventive concept. In other examples, well-known procedures, materials, or methods are not specifically described to avoid confusion with the present inventive concept.

Figure 1:
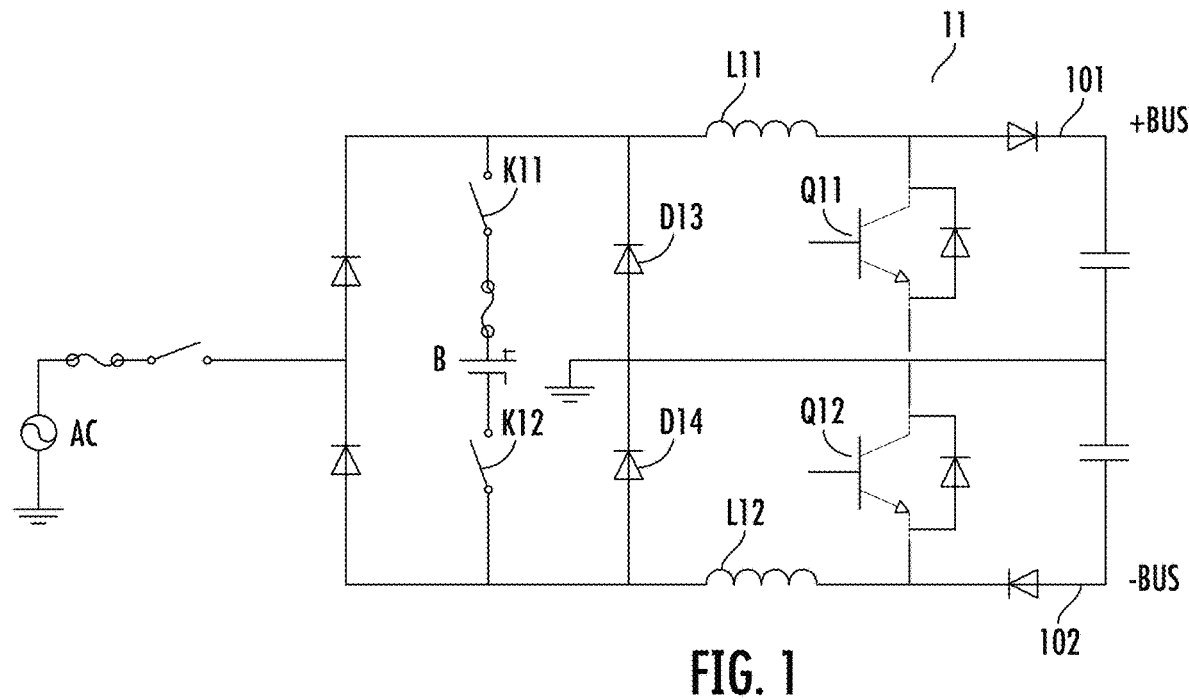
FIG. 1 is a schematic diagram of a multiplexing circuit 11 of an AC-DC power factor control (PFC) circuit and a battery discharge DC-DC circuit for an uninterruptible power supply in the conventional technology.
Figure 2:
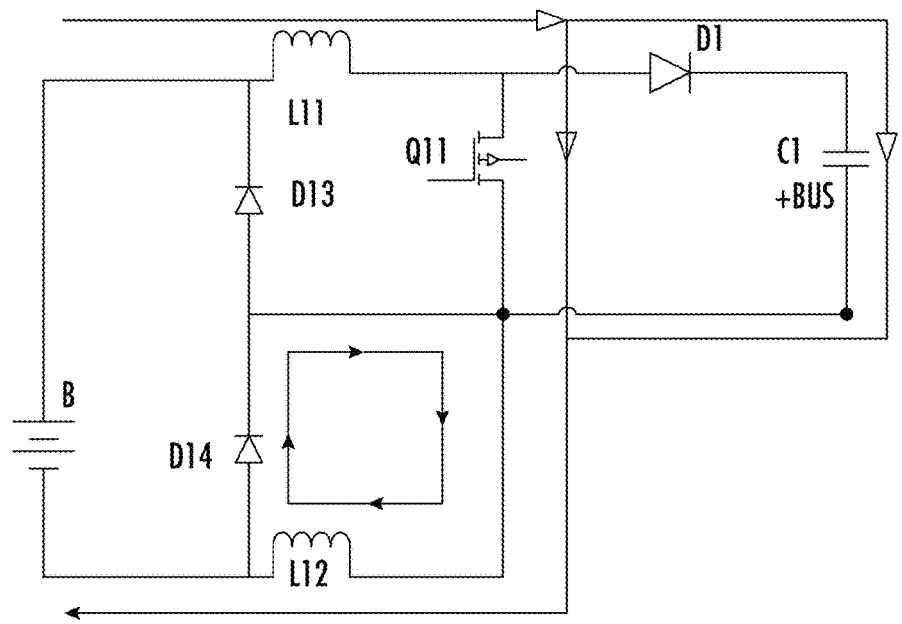
FIG. 2 is a schematic diagram of current flow directions of the multiplexing circuit 11 shown in FIG. 1 in a positive half cycle operating state in a battery mode.

FIG. 1 is a schematic diagram of a multiplexing circuit 11 of an alternating current (AC)-direct current (DC) power factor control (PFC) circuit and a battery discharge DC-DC circuit for a single-battery uninterruptible power supply in the conventional technology. As shown in FIG. 1, the multiplexing circuit uses a dual-BOOST circuit topology. When in a mains supply mode, direct current switches K11 and K12 are opened to isolate a battery B from a mains supply, and the alternating current mains supply performs power factor control on pulse width modulation of a positive-side switching transistor Q11 and a negative-side switching transistor Q12, so that a direct current is output to a positive direct current bus 101 and a negative direct current bus 102. When the mains supply fails and in a battery mode, the direct current switches K11 and K12 are closed, so that the battery B supplies power to the positive direct current bus 101 and the negative direct current bus 102. In a process of providing the direct current to the positive and negative direct current buses, positive and negative half-sides of the circuit topology operate alternately. For example, when the positive direct current bus 101 is powered, the positive-side switching transistor Q11 is controlled to perform pulse width modulation, and the negative-side switching transistor Q12 is always in an on state; and when the negative direct current bus 102 is powered, the negative-side switching transistor Q12 is controlled to perform pulse width modulation, and the positive-side switching transistor Q11 is always in an on state. Such a topology design has the following defects: For the single battery B, when in the battery mode, lines connected to positive and negative electrodes of the battery B have high-frequency jumping in electrical potential, and therefore, EMC is poor, and two clamping diodes D13 and D14 need to be used. After the diodes are added, in the battery mode, there are always currents flowing through two inductors L11 and L12 when the positive and negative half-sides operate alternately. As shown in FIG. 2, in the battery mode, for example, in a positive half cycle operating state, when the switching transistor Q11 is switched on and off at a high frequency and the switching transistor Q12 is constantly on, the current of the inductor L12 is a continuous direct current, and a circulating current is formed between the inductor L12 and the diode D14, short-circuiting the inductor L12 and allowing a large current to pass through.

Figure 3:
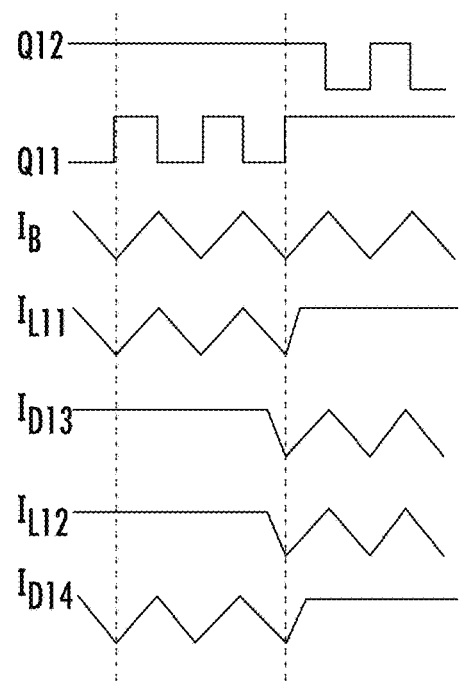
FIG. 3 shows pulse width modulation control signals and current waveforms of corresponding components when the circuit shown in FIG. 1 is in a battery mode operating state.

FIG. 3 shows pulse width modulation control signals and current waveforms of corresponding components when the circuit shown in FIG. 1 is in a battery mode operating state. A dashed line range shows an operating situation of the positive half-side, where the positive-side switching transistor Q11 is controlled to perform pulse width modulation, the negative-side switching transistor Q12 is controlled to be in an on state, a current on the inductor L11 is a triangular wave current, a current on the inductor L12 is a substantially constant direct current, and an inductor action is not played, which is equivalent to being shorted. It can be learned that, in this battery mode, the heating of the two inductors is extremely severe, forcing an increase in inductor size, which is a significant drawback. In addition, such a dual-BOOST circuit topology includes two inductors. During operation in each half cycle in the mains supply mode, only one inductor is involved, resulting in low inductor utilization.

Figure 4:
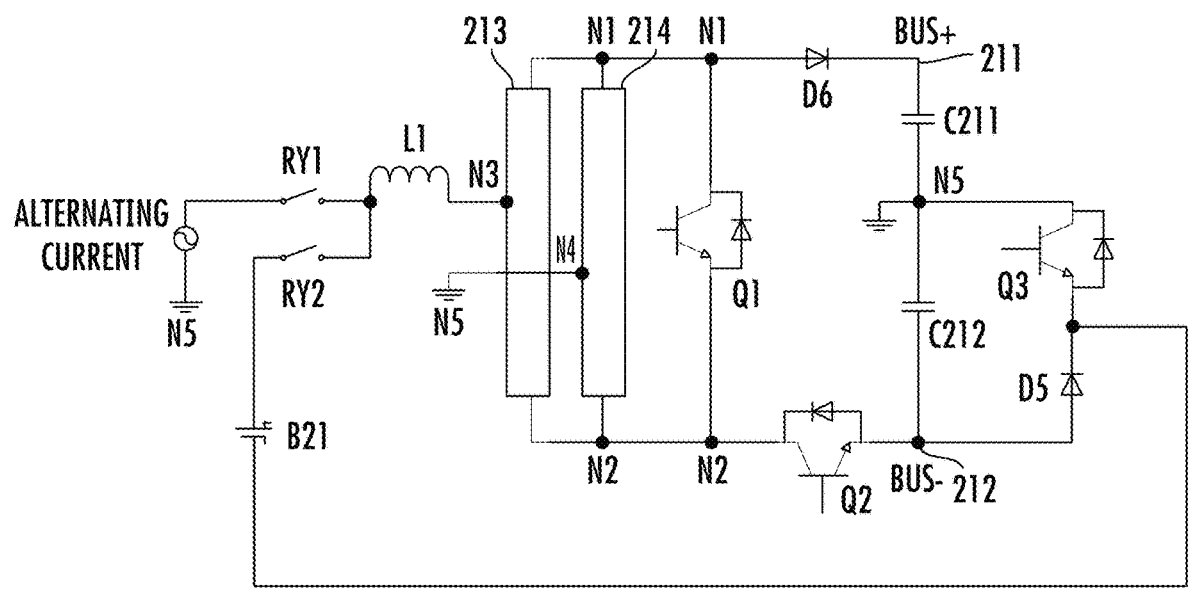
FIG. 4 is a schematic diagram of a power factor correction (PFC) and DC-DC multiplexing circuit according to some embodiments of the present inventive concept.

The inventor, after research, proposes a multiplexing converter for a power factor correction (PFC) and DC-DC multiplexing circuit of an uninterruptible power supply. FIG. 4 is a schematic diagram of a power factor correction (PFC) and DC-DC multiplexing circuit according to some embodiments of the present inventive concept, including: a first mechanical switch RY1, configured to connect the converter to a mains supply; a second mechanical switch RY2, configured to connect the converter to a battery; an inductor L1, one end of which is connected to the mains supply through the first mechanical switch RY1, and connected to a positive electrode of the battery B21 through the second mechanical switch RY2; a first node N1 and a second node N2; a first rectifier bridge arm 213, connected between the first node N1 and the second node N2, where the first rectifier bridge arm 213 has a first intermediate node N3, and the first intermediate node N3 is connected to the other end of the inductor L1; a second rectifier bridge arm 214, connected between the first node N1 and the second node N2, where the second rectifier bridge arm 214 has a second intermediate node N4, and the second intermediate node N4 is connected to a neutral point N5; a first semiconductor switch Q1, connected between the first node N1 and the second node N2 to control conduction between the first node N1 and the second node N2; a positive direct current bus 211 and a negative direct current bus 212, configured to provide a direct current output; a first diode D6, connected between the first node N1 and the positive direct current bus 211; a second semiconductor switch Q2, connected between the second node N2 and the negative direct current bus 212, and configured to control conduction between the second node N2 and the negative direct current bus 212; a first capacitor C211, connected between the positive direct current bus 211 and the neutral point N5; a second capacitor C212, connected between the neutral point N5 and the negative direct current bus 212; a third semiconductor switch Q3, connected between the neutral point N5 and the negative electrode of the battery B21, and configured to control conduction between the neutral point N5 and the negative electrode of the battery B21; and a second diode D5, connected between the negative direct current bus 212 and the negative electrode of the battery B21. In this embodiment, the second semiconductor switch is shown as an insulated gate bipolar junction transistor connected in antiparallel with a diode, but may also be replaced with another suitable transistor connected in antiparallel with a diode.

Figure 5:
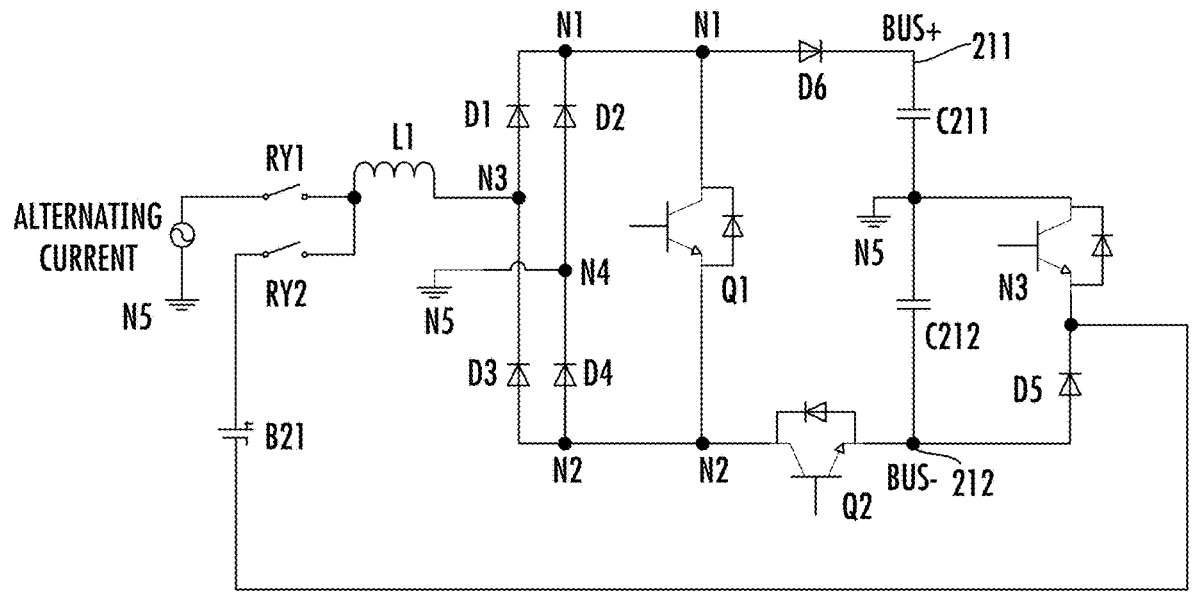
FIG. 5 is a schematic diagram of a power factor correction (PFC) and DC-DC multiplexing circuit connected to a single-phase alternating current power supply AC (mains supply) or a battery B21 according to some embodiments of the present inventive concept.

FIG. 5 is a schematic diagram of a power factor correction (PFC) and DC-DC multiplexing circuit connected to a single-phase alternating current power supply AC (mains supply) or a battery B21 according to some embodiments of the present inventive concept. The power factor correction and DC-DC multiplexing circuit is configured to rectify, in a mains supply mode, an alternating current output by the mains supply and perform power factor correction, or convert, in a battery mode, a direct current output by the battery, where an anode of a third diode D1 is connected to a cathode of a fourth diode D3 to form a first rectifier bridge arm, and an anode of a fifth diode D2 is connected to a cathode of a sixth diode D4 to form a second rectifier bridge arm; and a cathode of the third diode D1 and a cathode of the fifth diode D2 are connected to a first node N1, a second intermediate node N4 between the anode of the fifth diode D2 and the cathode of the sixth diode D4 is connected to a neutral point N5, and an anode of the fourth diode D3 and an anode of the sixth diode D4 are connected to a second node N2.

In addition, a collector, namely, a second electrode of a switching transistor Q1 (first semiconductor switch) is connected to the first node N1, and an emitter, namely, a first electrode of the switching transistor Q1 is connected to the second node N2; a collector, namely, a second electrode of a switching transistor Q2 (second semiconductor switch) is connected to the second node N2, and an emitter, namely, a first electrode of the switching transistor Q2 is connected to a negative direct current bus 212 serving as an output; and an anode of a first diode D6 is connected to the first node N1, and a cathode of the first diode D6 is connected to the positive direct current bus 211 serving as another output.

In addition, a direct current bus capacitor C211 and a direct current bus capacitor C212 are connected in series, one end of the direct current bus capacitor C211 is connected to the positive direct current bus 211 serving as an output, and the other end of the direct current bus capacitor C212 is connected to the negative direct current bus 212 serving as another output.

In addition, one end of an inductor L1 is connected to a first intermediate node N3 between the anode of the third diode D1 and the cathode of the fourth diode D3, and the other end of the inductor L1 is connected to the mains supply through an alternating current switch RY1 (first mechanical switch), and is connected to a positive electrode of the battery B21 through a direct current switch RY2 (second mechanical switch).

The multiplexing circuit further includes a switching transistor Q3 (third semiconductor switch) and a second diode D5. A collector (second electrode) of the switching transistor Q3 is connected to a neutral point N5 between the direct current bus capacitor C211 and the direct current bus capacitor C212, and an emitter (first electrode) of the switching transistor Q3 is connected to a negative electrode of the battery B21. The second diode D5 is connected in series between the emitter of the switching transistor Q3 and the negative direct current bus 212. An anode of the second diode D5 is connected to the negative direct current bus 212, and a cathode of the second diode D5 is connected to the emitter of the switching transistor Q3.

The following describes in detail operating states of the PFC and the DC-DC multiplexing circuit.

Figure 6A:
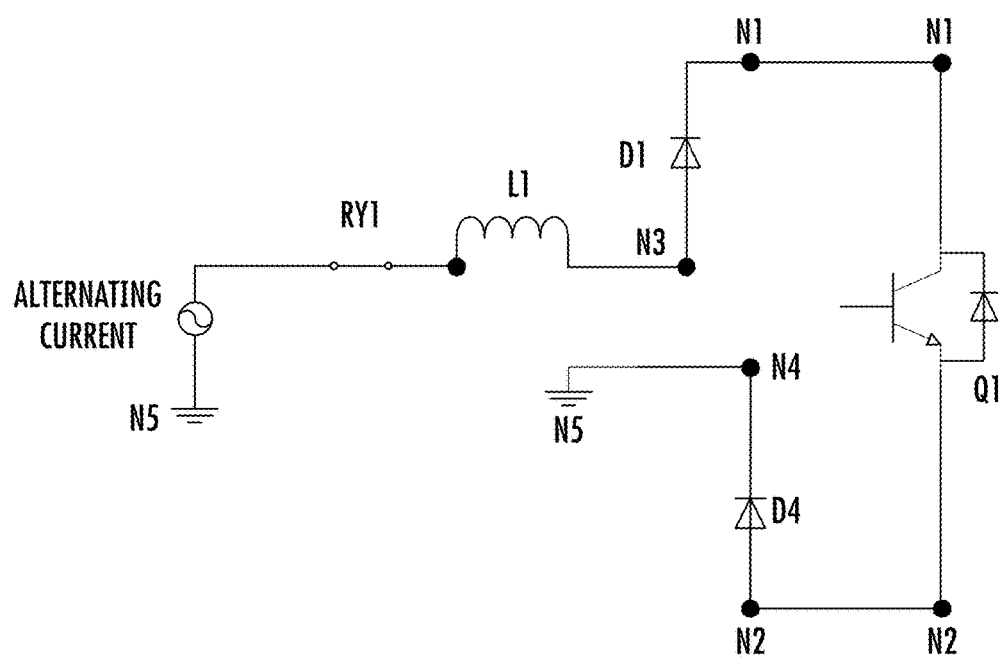
FIG. 6a shows a schematic diagram of an equivalent circuit corresponding to storing energy in an inductor by the mains supply in a positive half cycle in a mains supply mode in the embodiments shown in FIG. 5.
Figure 6B:
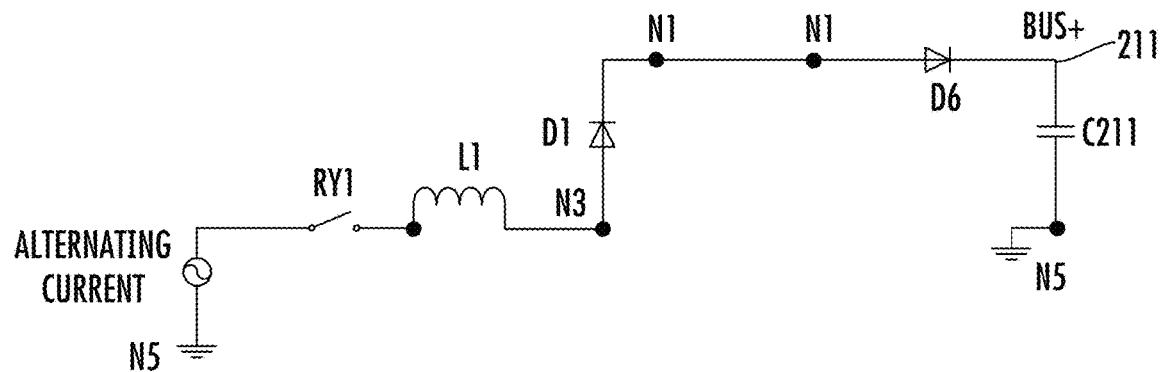
FIG. 6b shows a schematic diagram of an equivalent circuit corresponding to a process of charging a positive direct current bus by the inductor in the positive half cycle in the mains supply mode in the embodiments shown in FIG. 5.
Figure 7A:
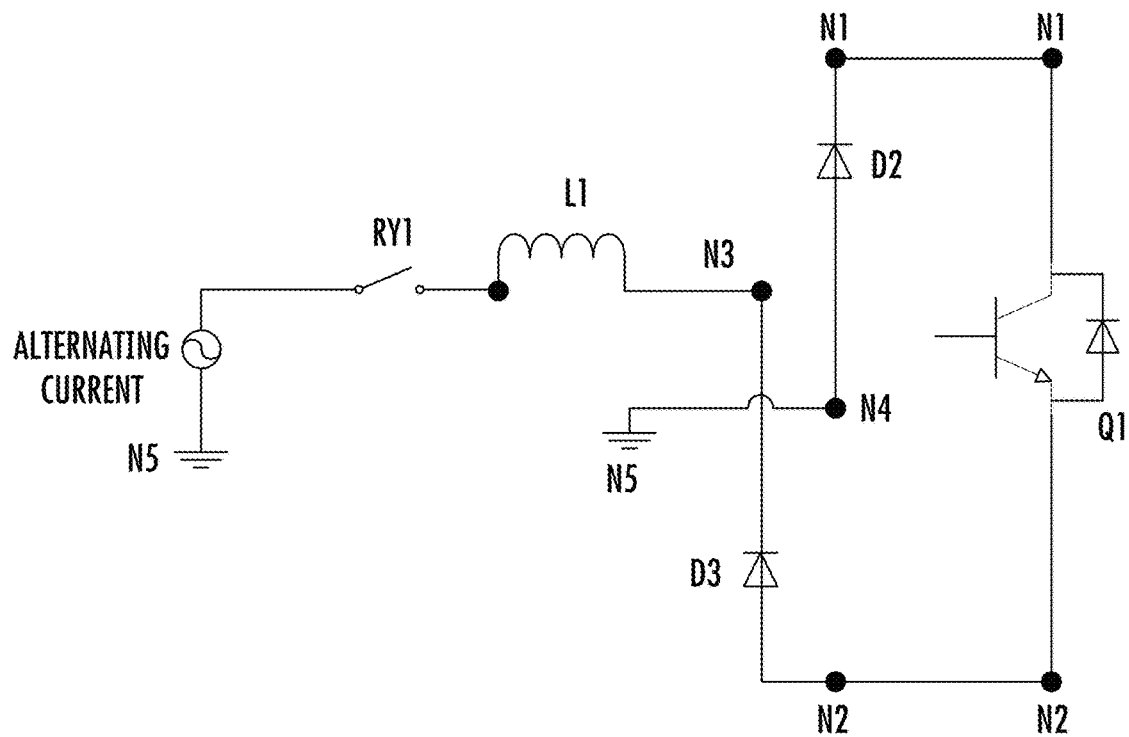
FIG. 7a shows a schematic diagram of an equivalent circuit corresponding to storing energy in the inductor by the mains supply in a negative half cycle in the mains supply mode in the embodiments shown in FIG. 5.
Figure 7B:
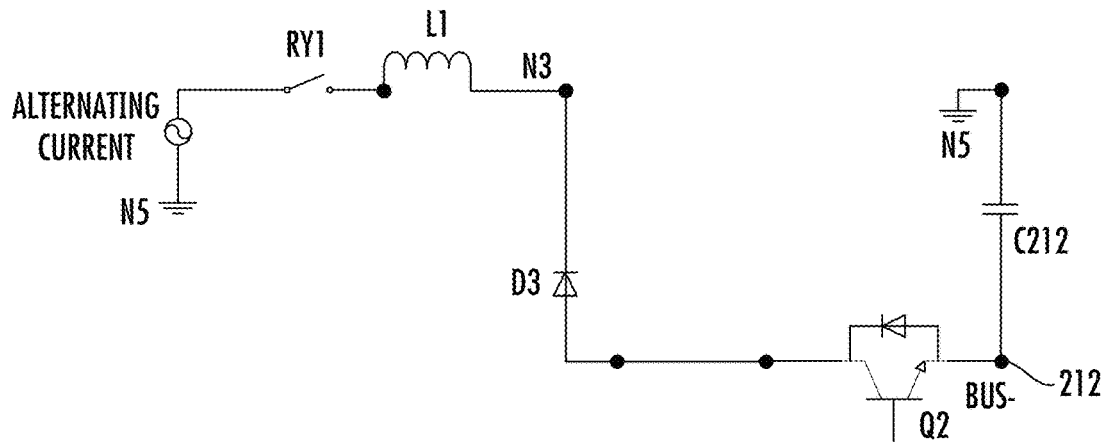
FIG. 7b shows a schematic diagram of an equivalent circuit corresponding to a process of charging a negative direct current bus by the inductor in the negative half cycle in the mains supply mode in the embodiments shown in FIG. 5.

FIG. 6a and FIG. 6b respectively show a schematic diagram of an equivalent circuit corresponding to storing energy in an inductor by the mains supply (FIG. 6a) and a schematic diagram of an equivalent circuit corresponding to a process of charging the positive direct current bus by the inductor (FIG. 6b) in a positive half cycle in the mains supply mode in the embodiments shown in FIG. 5. In the mains supply mode, the alternating current switch RY1 is closed (on) and the direct current switch RY2 is opened (off). The switching transistor Q1 is controlled in positive and negative half cycles to perform pulse width modulation, and the switching transistors Q2 and Q3 remain in an off state. In the alternating current positive half cycle, when the switching transistor Q1 is switched on by the pulse width modulation, a current direction is the AC power supply→the inductor L1→the diode D1→the switching transistor Q1→the diode D4→the neutral point N5, where the inductor L1 stores energy. When the switching transistor Q1 is switched off by the pulse width modulation, a current direction is the AC power supply→the inductor L1→the diode D1→the diode D6→the capacitor C211→the neutral point N5, where the AC power supply and the inductor L1 are connected in series to supply power to the positive direct current bus 211. FIG. 7a and FIG. 7b respectively show a schematic diagram of an equivalent circuit corresponding to storing energy in the inductor by the mains supply (FIG. 7a) and a schematic diagram of an equivalent circuit corresponding to a process of charging the negative direct current bus by the inductor (FIG. 7b) in a negative half cycle in the mains supply mode in the embodiments shown in FIG. 5. In the alternating current negative half cycle, when the switching transistor Q1 is switched on by the pulse width modulation, a current direction is the neutral point N5→the diode D2→the switching transistor Q1→the diode D3→the inductor L1→the AC power supply, where the inductor L1 stores energy. When the switching transistor Q1 is switched off by the pulse width modulation, a current direction is the neutral point N5→the capacitor C212→the switching transistor Q2→the diode D3→the inductor L1→the AC power supply, where the AC power supply and the inductor L1 are connected in series to supply power to the negative direct current bus 212.

Figure 8:
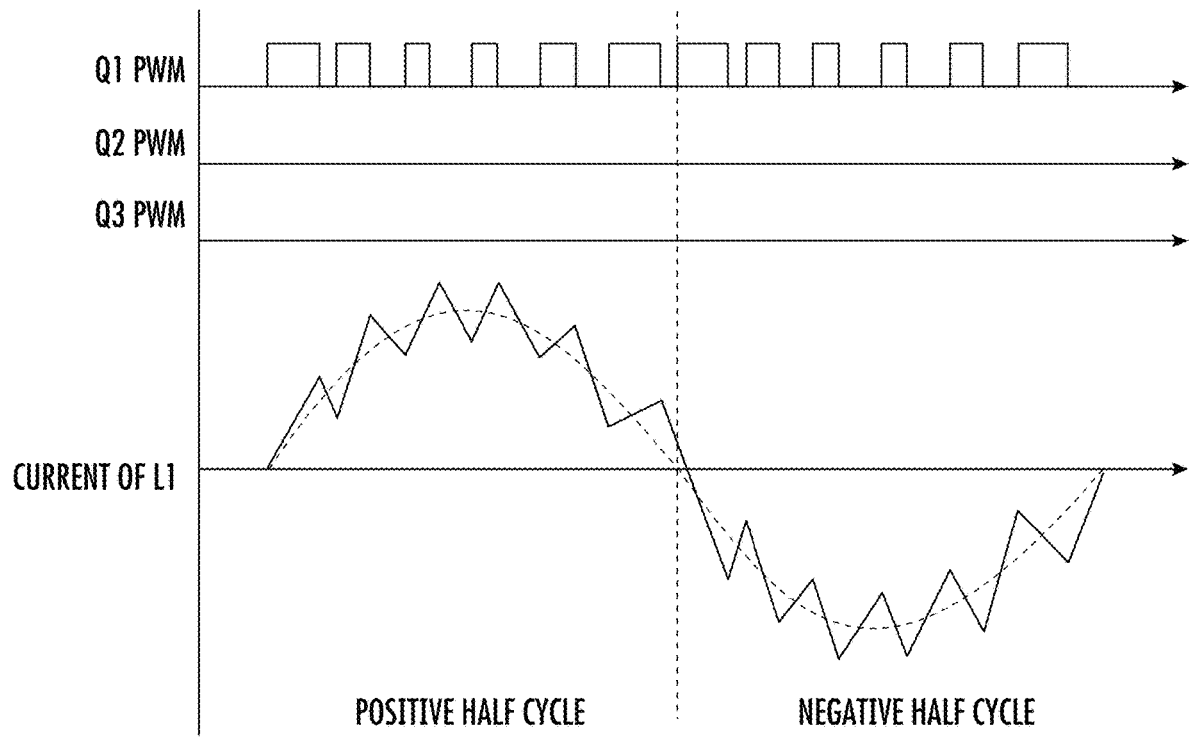
FIG. 8 shows pulse width modulation control signals and current waveforms of corresponding components when the circuit shown in FIG. 5 operates in the positive and negative half cycles in the mains supply mode.

FIG. 8 shows example pulse width modulation control signals and current waveforms of corresponding components when the circuit shown in FIG. 5 operates in the positive and negative half cycles in the mains supply mode. The switching transistor Q1 is controlled to perform pulse width modulation, the switching transistor Q2 and the switching transistor Q3 are controlled to be in an off state, and a current on the inductor L1 presents a triangular wave current as the switching transistor Q1 is switched on and off, where a rising waveform indicates that the inductor L1 is in a charging state, and a falling waveform indicates that the inductor L1 is in a discharging state. For the positive and negative half cycles, PWM signals of Q1 in each half cycle need to be wider at both ends and narrower in the middle and the current of the L1 needs to be drawn as a sine wave superimposed with a triangular ripple wave in each half cycle.

When the mains supply fails, the system switches to the battery mode. In this case, the alternating current switch RY1 is opened (off) and the direct current switch RY2 is closed (on).

Figure 9A:
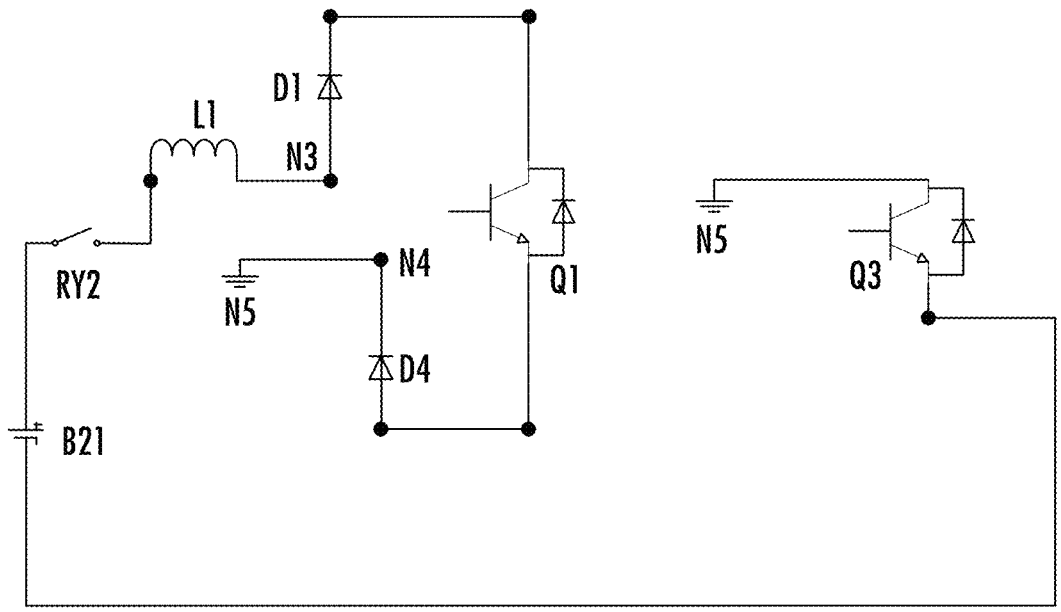
FIG. 9a shows a schematic diagram of an equivalent circuit corresponding to storing energy in an inductor by the battery in a positive half cycle in a battery mode in the embodiments shown in FIG. 5.
Figure 9B:
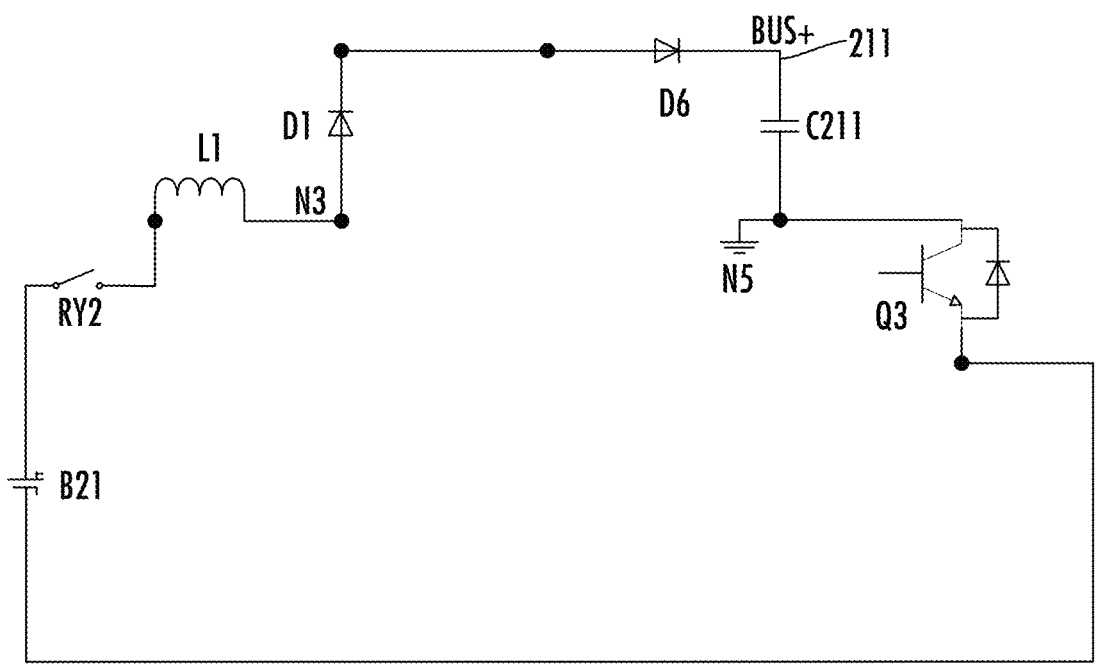
FIG. 9b shows a schematic diagram of an equivalent circuit corresponding to a process of charging a positive direct current bus by the inductor in the positive half cycle in the battery mode in the embodiments shown in FIG. 5.

FIG. 9a and FIG. 9b respectively show a schematic diagram of an equivalent circuit corresponding to storing energy in an inductor by the battery (FIG. 9a) and a schematic diagram of an equivalent circuit corresponding to a process of charging the positive direct current bus by the inductor (FIG. 9b) in a positive half cycle in the battery mode in the embodiments shown in FIG. 5. In a process in which the battery B21 charges the positive half-side direct current bus 211 (positive half cycle), the switching transistor Q3 remains on, the switching transistor Q2 remains off, and the switching transistor Q1 is controlled to perform PFC pulse width modulation. When the switching transistor Q1 is switched on, a current direction is the positive electrode of the battery B21→the inductor L1→the diode D1→the switching transistor Q1→the diode D4→the neutral point N5→the switching transistor Q3→the negative electrode of the battery B21, where the battery B21 stores energy in the inductor L1. When the switching transistor Q1 is switched off, a current direction is the positive electrode of the battery B21→the inductor L1→the diode D1→the diode D6→the capacitor C211→the neutral point N5→the switching transistor Q3→the negative electrode of the battery B21, where the battery B21 is connected in series with the inductor L1 to charge the positive direct current bus 211 and the direct current bus capacitor C211.

It can be learned that, in a process of supplying power to the positive half-side positive direct current bus 211, the negative electrode of the battery B21 is always connected to the neutral point N5 through the switching transistor Q3 that is switched on, and therefore, a potential of the negative electrode is always a potential of the neutral point N5.

Figure 10A:
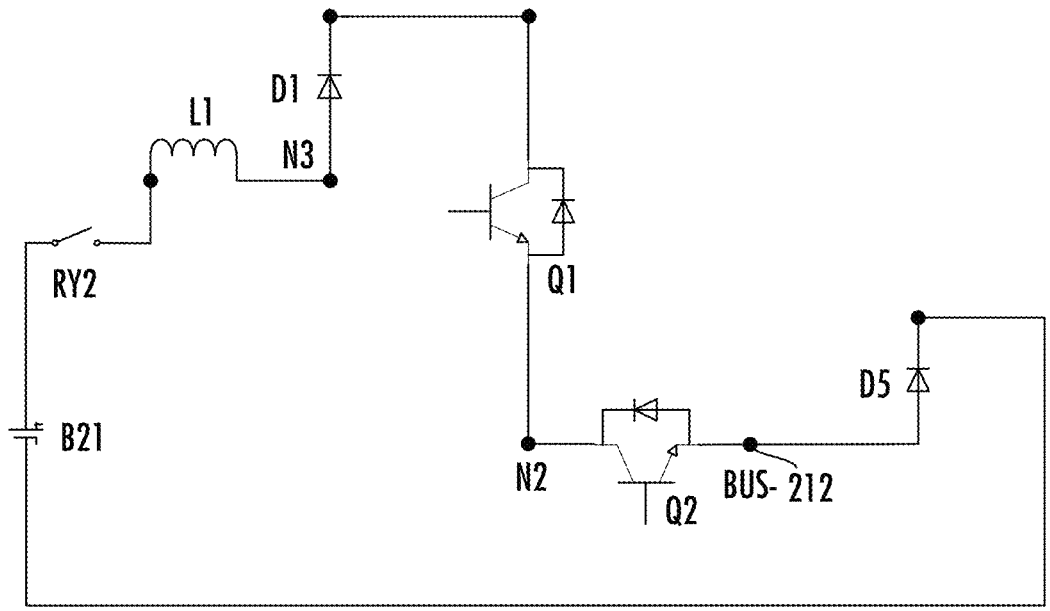
FIG. 10a shows a schematic diagram of an equivalent circuit corresponding to storing energy in the inductor by the battery in a negative half cycle in the battery mode in the embodiments shown in FIG. 5.
Figure 10B:
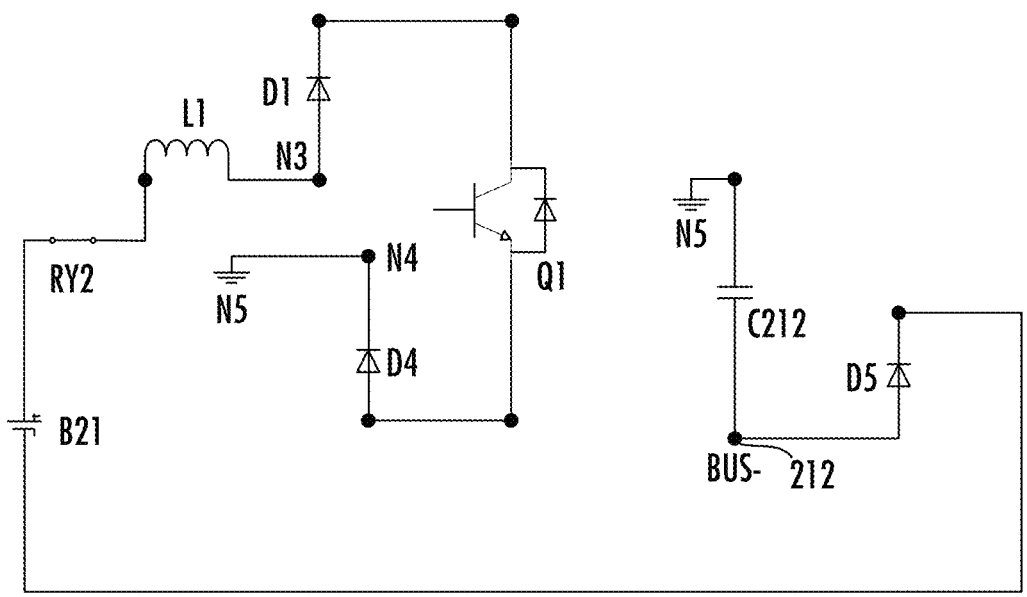
FIG. 10b shows a schematic diagram of an equivalent circuit corresponding to a process of charging a negative direct current bus by the inductor in the negative half cycle in the battery mode in the embodiments shown in FIG. 5.

FIG. 10a and FIG. 10b respectively show a schematic diagram of an equivalent circuit corresponding to storing energy in an inductor by the battery (FIG. 10a) and a schematic diagram of an equivalent circuit corresponding to a process of charging the negative direct current bus by the inductor (FIG. 10b) in a negative half cycle in the battery mode in the embodiments shown in FIG. 5. In a process in which the battery B21 charges the negative half-side direct current bus 212 (negative half cycle), the switching transistor Q1 remains on, the switching transistor Q3 remains off, and the switching transistor Q2 performs PFC pulse width modulation. When the switching transistor Q2 is switched on, a current direction is the positive electrode of the battery B21→the inductor L1→the diode D1→the switching transistor Q1→the switching transistor Q2→the diode D5→the negative electrode of the battery B21, where the battery B21 charges the inductor L1. When the switching transistor Q2 is switched off, a current direction is the positive electrode of the battery B21→the inductor L1→the diode D1→the switching transistor Q1→the diode D4→the neutral point N5→the capacitor C212→the diode D5→the negative electrode of the battery B21. The battery B21 is connected in series with the inductor L1 to charge the negative direct current bus 212 and the direct current bus capacitor C212.

It can be learned that in a process of supplying power to the negative half-side negative direct current bus 212, the potential of the negative electrode of the battery B21 is always consistent with a potential of the negative direct current bus 212.

Figure 11:
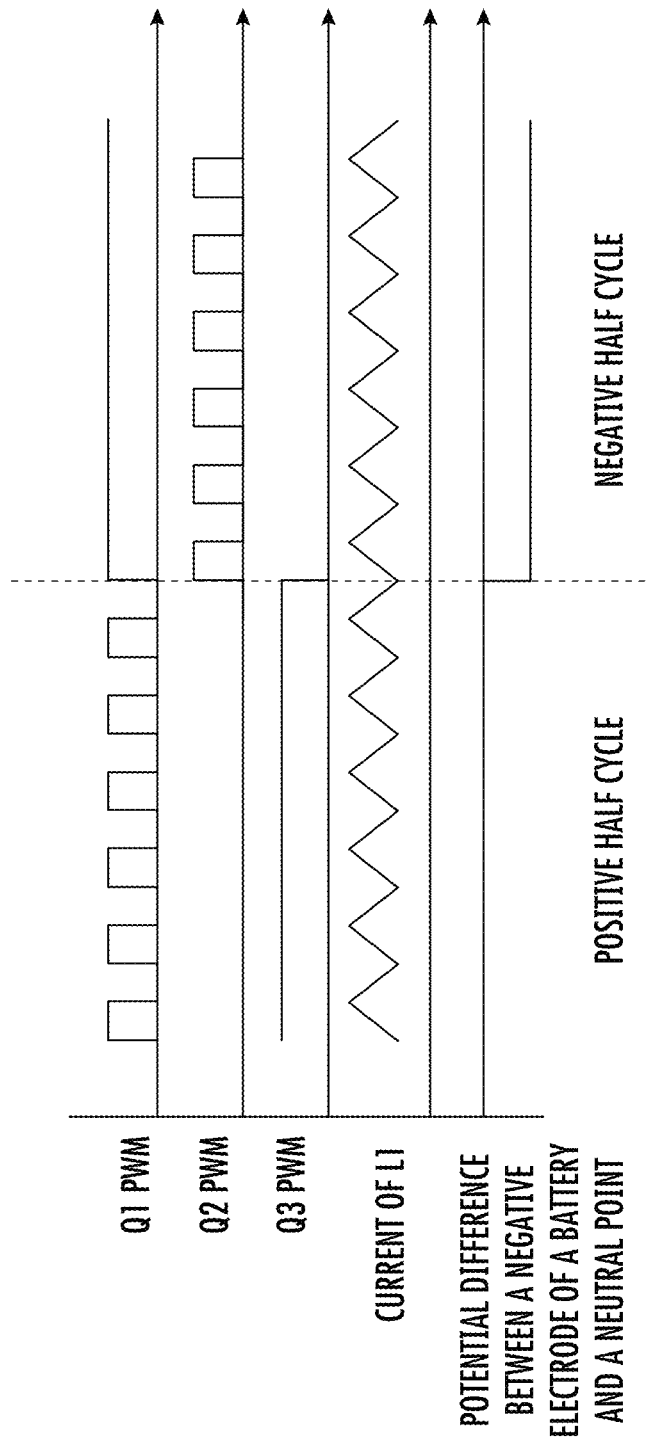
FIG. 11 shows example pulse width modulation control signals and current waveforms of corresponding components when the circuit shown in FIG. 5 operates in the positive and negative half cycles in the battery mode.

FIG. 11 shows example pulse width modulation control signals and current waveforms of corresponding components when the circuit shown in FIG. 5 operates in the positive and negative half cycles in the battery mode. When the battery discharges to supply power to the positive direct current bus, that is, during operation in the positive half cycle, the switching transistor Q1 is controlled to perform pulse width modulation, the switching transistor Q2 is controlled to be in an off state, the switching transistor Q3 is controlled to be in an on state, and a current on the inductor L1 presents a triangular wave current as the switching transistor Q1 is switched on and off, where a rising waveform indicates that the inductor L1 is in a charging state, and a falling waveform indicates that the inductor L1 is in a discharging state. When the battery discharges to supply power to the negative direct current bus, that is, during operation in the negative half cycle, the switching transistor Q2 is controlled to perform pulse width modulation, the switching transistor Q1 is controlled to be in an on state, the switching transistor Q3 is controlled to be in an off state, and a current on the inductor L1 presents a triangular wave current as the switching transistor Q2 is switched on or off. In the foregoing processes, a potential difference between the negative electrode of the battery B21 and the neutral point N5 jumps with a level of Q3, the jumping is power frequency jumping, and a frequency is very low.

It may be learned from the above that because the battery B21 alternately supplies power to the positive and negative half-side direct current buses at a relatively low power frequency, for example, the power frequency is consistent with or on a same order of magnitude as an alternating current frequency. Because a voltage difference between the positive and negative electrodes of the battery is stable, the positive electrode of the battery also jumps with a similar level difference and frequency. The PFC and DC-DC multiplexing circuit 21 has better electromagnetic compatibility. Compared with a conventional dual-Boost circuit, the converter in the embodiments of the present inventive concept has only one inductor, and inductor utilization is relatively high, thereby saving inductor costs and space. Multiplexing of a battery discharge DC-DC circuit and a mains supply PFC circuit is effectively implemented in single battery application, and the size and costs of the entire system are saved. In a battery discharge mode, there will be no high-frequency jumping of a potential of a battery wire, resolving an EMC problem that occurs when the conventional dual-Boost circuit is connected to a single battery and resolving the problems of inductor overheating and low inductor utilization that exist after clamping diodes are added.

The foregoing embodiments are merely used to describe the technical solutions of the present inventive concept, instead of limiting the technical solutions of the present inventive concept. Although the present inventive concept is described in detail with reference to the foregoing embodiments, those of ordinary skill in the art should understand that they may still modify the technical solutions described in the foregoing embodiments, or perform equivalent replacement on some technical features. However, these modifications or replacements do not make the essence of the corresponding technical solutions depart from the spirit and scope of the technical solutions in the embodiments of the present inventive concept, and shall fall within the protection scope of the present inventive concept.

What is claimed is:

1. A power factor correction and direct current (DC)-DC multiplexing converter, comprising:
    a first mechanical switch, configured to connect the converter to a mains supply;
    a second mechanical switch, configured to connect the converter to a battery;
    an inductor, one end of which is connected to the mains supply through the first mechanical switch, and connected to a positive electrode of the battery through the second mechanical switch;
    a first node and a second node;
    a first rectifier bridge arm, connected between the first node and the second node, wherein the first rectifier bridge arm has a first intermediate node, and the first intermediate node is connected to the other end of the inductor;
    a second rectifier bridge arm, connected between the first node and the second node, wherein the second rectifier bridge arm has a second intermediate node, and the second intermediate node is connected to a neutral point;
    a first semiconductor switch, connected between the first node and the second node, and configured to control conduction between the first node and the second node;
    a positive direct current bus and a negative direct current bus, configured to provide a direct current output;
    a first diode, connected between the first node and the positive direct current bus;
    a second semiconductor switch, connected between the second node and the negative direct current bus, and configured to control conduction between the second node and the negative direct current bus;
    a first capacitor, connected between the positive direct current bus and the neutral point;
    a second capacitor, connected between the neutral point and the negative direct current bus;
    a third semiconductor switch, connected between the neutral point and the negative electrode of the battery, and configured to control conduction between the neutral point and the negative electrode of the battery; and
    a second diode, connected between the negative direct current bus and the negative electrode of the battery.

2. The multiplexing converter of claim 1, wherein the conduction from the second node to the negative direct current bus is controlled, and the conduction from the negative direct current bus to the second node is uncontrolled.

3. The multiplexing converter of claim 2, wherein the second semiconductor switch is a transistor connected in antiparallel with a diode.

4. The multiplexing converter of claim 3, wherein the second semiconductor switch, connected between the second node and the negative direct current bus, comprises that:
    a first electrode of the second semiconductor switch is connected to the negative direct current bus, and a second electrode of the second semiconductor switch is connected to the second node.

5. The multiplexing converter of claim 1, wherein the first semiconductor switch and the third semiconductor switch are transistors.

6. The multiplexing converter of claim 5, wherein the first semiconductor switch, connected between the first node and the second node, comprises that:
    a first electrode of the first semiconductor switch is connected to the second node, and a second electrode of the first semiconductor switch is connected to the first node.

7. The multiplexing converter of claim 5, wherein the third semiconductor switch, connected between the neutral point and the negative electrode of the battery, comprises that:
    a first electrode of the third semiconductor switch is connected to the negative electrode of the battery, and a second electrode of the third semiconductor switch is connected to the neutral point.

8. The multiplexing converter of claim 3, wherein the transistor is a MOSFET or an IGBT.

9. The multiplexing converter of claim 1, wherein the first rectifier bridge arm, connected between the first node and the second node, comprises that:

the first rectifier bridge arm comprises a third diode and a fourth diode, wherein a cathode of the third diode is connected to the first node, an anode of the third diode is connected to a cathode of the fourth diode, and an anode of the fourth diode is connected to the second node.

10. The multiplexing converter of claim 1, wherein the second rectifier bridge arm, connected between the first node and the second node, comprises that:

the second rectifier bridge arm comprises a fifth diode and a sixth diode, wherein a cathode of the fifth diode is connected to the first node, an anode of the fifth diode is connected to a cathode of the sixth diode, and an anode of the sixth diode is connected to the second node.

* * * * *